May 31, 1960 H. J. MAILHOT 2,938,389
DYNAMIC BALANCING MEANS
Filed May 29, 1953 2 Sheets-Sheet 1
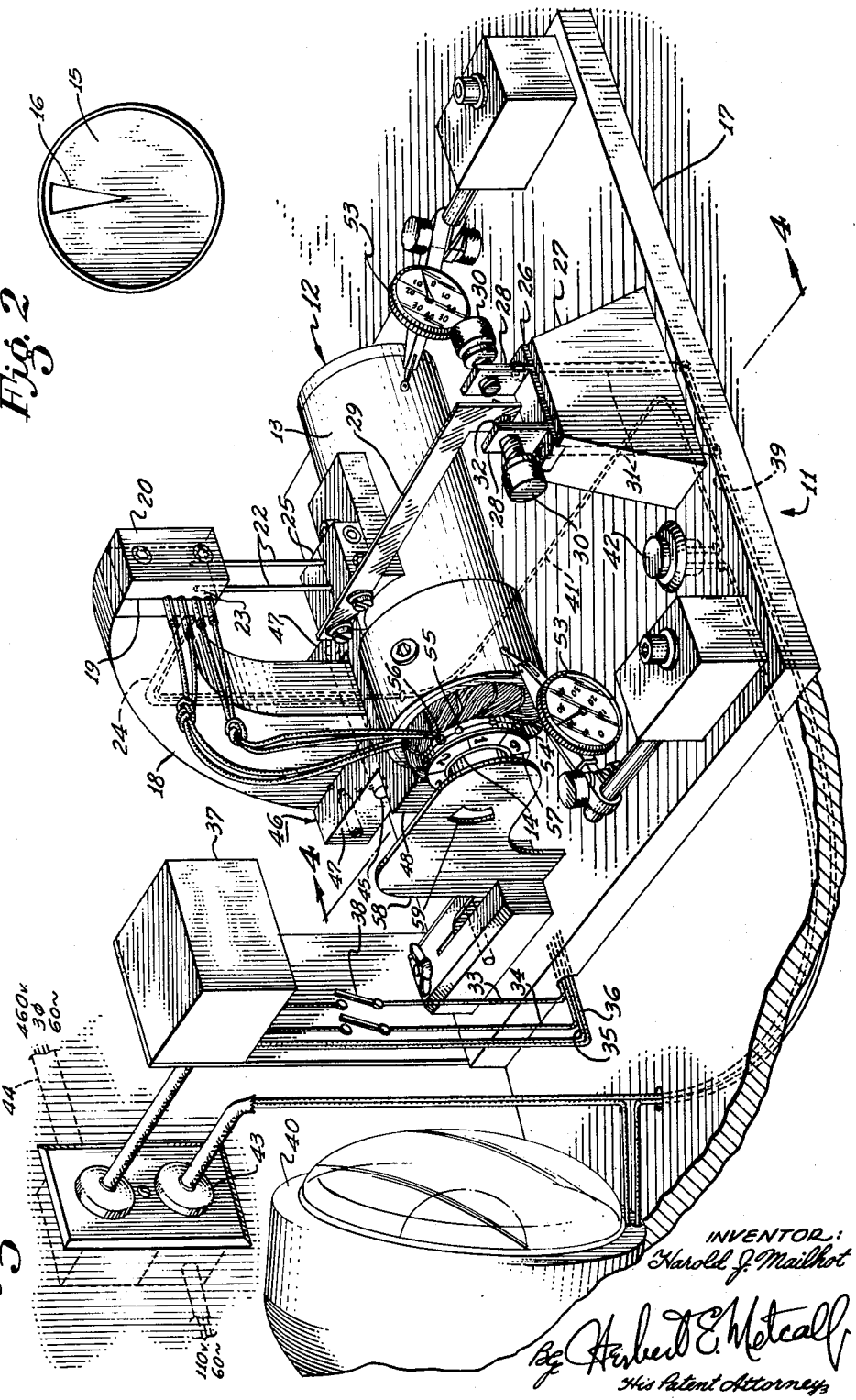
INVENTOR:
Harold J. Mailhot
By Herbert E. Metcalf
His Patent Attorneys May 31, 1960
H. J. MAILHOT
2,938,389
DYNAMIC BALANCING MEANS
Filed May 29, 1953
2 Sheets-Sheet 2
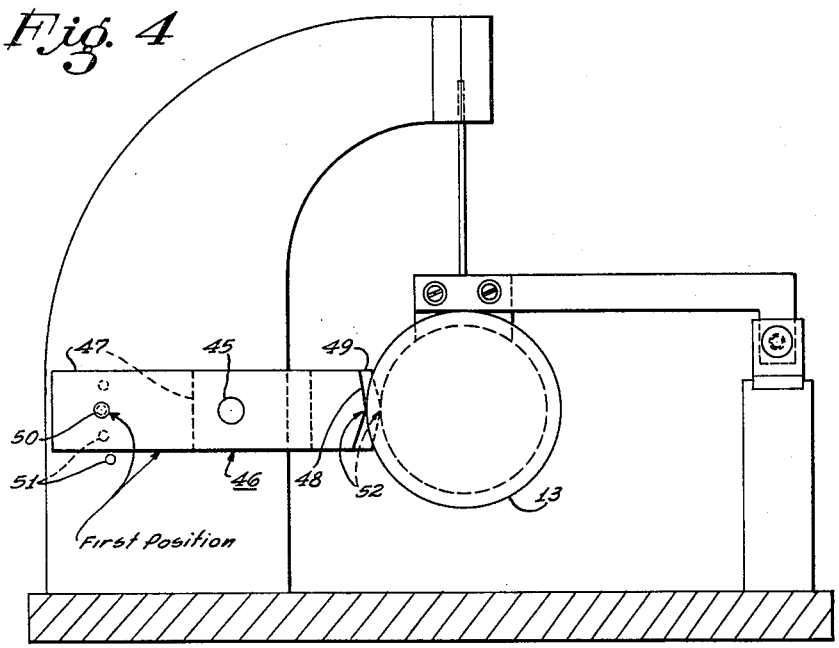
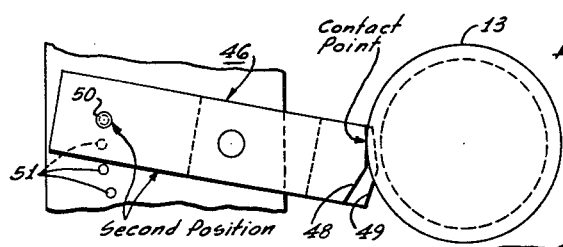
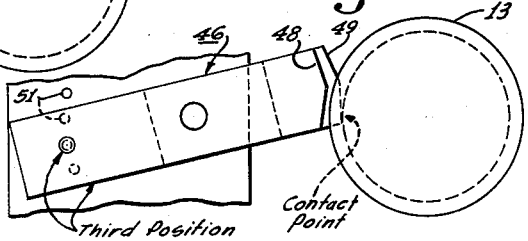
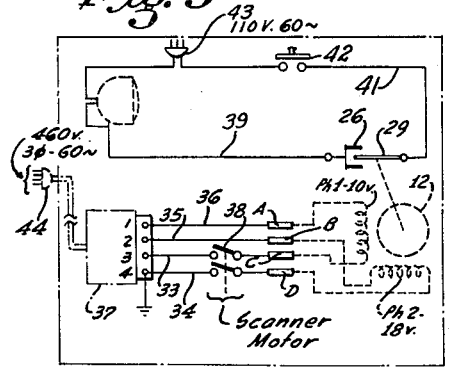
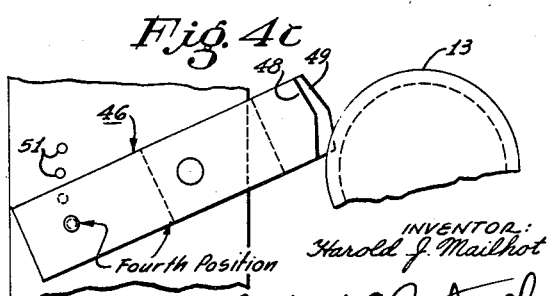
INVENTOR:
Harold J. Mailhot
By Herbert E. Metcalf
His Patent Attorney

United States Patent Office 2,938,389
Patented May 31, 1960

2,938,389

DYNAMIC BALANCING MEANS

Harold J. Mailhot, Gardena, Calif., assignor to Northrop Corporation, Hawthorne, Calif., a corporation of California Filed May 29, 1953, Ser. No. 358,368

1 Claim. (Cl. 73—478)

This invention relates to apparatus for determining the dynamic unbalance of a rotatable part and more particularly to apparatus of the aforementioned type incorporating novel suspension means for the part whereby the location and amount of its unbalance may be determined to conform to the most exacting requirements.

Vibrations of varying magnitudes are universally present in bodies rotating at any appreciable degree of speed unless their center of gravity coincides with their axis of rotation. This condition is rarely present in rotating bodies due to manufacturing irregularities and non-homogeneity of the material from which they are constructed. Such vibrations are exceedingly objectional for many reasons, e.g. they may result in excessive wear of bearings supporting the part, they may affect the fatigue properties of the material from which the part is constructed, they may affect the accuracy of a precision device, and etc. In all cases a near balanced condition may be effected by adding or deducting weights to the rotating part, in each of two cross-sectional arbitrarily chosen planes, provided the position and magnitude of the unbalance is known.

For determining the amount a rotating part is unbalanced various types of balancing apparatus have been proposed and utilized, it is in connection with a novel balancing apparatus, in which small degrees of unbalance may be detected, that this invention relates. Briefly the apparatus of the present invention utilizes a pair of rods for suspending the part to be balanced, the rods having a vibrational frequency corresponding to the revolutions per unit of time of the part which is being balanced. As the vibrational frequency of the part being balanced is equal to its revolutions per minute, the vibrational frequencies of the pair of rods and that of the part are also equal. A strobolume is utilized to indicate the angular location at which weights should be added or deducted to the part while dial indicators are used to determine the amount of its unbalance.

The term "strobolume" as used throughout the specification and appended claim refers to an illuminating device similar in character to a stroboscope, the two devices differing only in the manner in which the flashing rate thereof is regulated or controlled. The flashing rate of a strobolume is controlled by an external contactor actuated by apparatus under observation while the flashing rate of a stroboscope is controlled by its own variable oscillator or like mechanism which is controlled independently of the apparatus being observed.

It is an object of the present invention to provide balancing apparatus capable of detecting dynamic unbalance of small magnitudes in rotating parts.

Another object is to provide balancing apparatus incorporating suspension means having a vibrational frequency equal to the number of revolutions of a rotating part, suspended thereby, per unit of time.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claim.

In the drawings:

Figure 1 is a perspective view of balancing apparatus utilizing the novel suspension means of the present invention.

Figure 2 is a view of a scanning disc which is mounted in the scanner assembly as shown in Figure 1.

Figure 3 is a schematic showing of the electrical wiring for the balancing apparatus of Figure 1.

Figure 4 is a sectional view of the balancing apparatus of Figure 1 taken on the line 4—4 thereof.

Figures 4a, 4b, and 4c are fragmentary views of the balancing apparatus of Figure 1, the views show the second, third, and fourth positions of the locking bracket.

Referring to the drawings for a detailed description of a preferred embodiment of the present invention, in Figure 1 the balancing apparatus 11 is shown as being utilized to dynamically balance a scanner assembly 12, the scanner assembly being of the type used in a telescope barrel of an automatic star tracking device as shown and described in U.S. application, Serial No. 81,224, filed March 14, 1949. The scanner assembly constitutes a two-phase induction type motor adapted to rotate at 36000 r.p.m. The motor comprises a stator 13, a hollow shallow shaft rotor 14, and a scanner disc 15 (Figure 2) adapted to be concentrically positioned within the hollow rotor for rotation therewith.

In a star tracking device, as disclosed in the above mentioned application, the scanner disc 15 may be said to constitute the heart of the device, however to function properly a specified relationship must be maintained between the scanner disc and the optical axis of the telescope. The surface of the scanner disc is opaque except for a small transparent sector 16 through which light from a subject light source may pass. The disc 15 is positioned within the hollow rotor 14 so that the apex of sector 16 is coincident with its axis of rotation, the scanner assembly 12 is then positioned in the barrel of a telescope so that the apex of the sector is coincident with the optical axis of the telescope. If this relationship is to be maintained as rotor 14 revolves at a high rate (3600 r.p.m.) it must be accurately balanced to free it of vibrations, this is accomplished with the balancing apparatus 11 which will now be described.

The balancing apparatus comprises a rectangular base portion 17, a goose neck bracket 18, secured to the base with its plane normal to the plane of the base, is provided with a vertical surface 19 also normal to the plane of the base. Attached to the bracket in contacting relationship with surface 19 is a plate 20 secured thereto by suitable screws. Plate 20 is provided with two semicylindrical grooves mating with similar grooves in surface 19 adapted to receive and secure two spaced rod members 22 with the plate in its position secured to surface 19. Suitable passageways 23 and 24 are provided in plate 20 and bracket 18, respectively, for electrical conductors which will be referred to later.

Suspended at the lower end of rod members 22 is a suspension member 25, the rod members being secured to this member in a similar manner as described in connection with bracket 18 and plate 20. The rod members 22 are vertically disposed and are parallel with respect to each other. The position of these rods is further characterized in that their axes and the axis of rotation of the rotor 14 lie in a common vertical plane. The lower surface of member 25 constitutes a portion of a cylindrical surface the axis of which is at right angles to the plane of bracket 18 and parallel to the plane of the base 17. The scanner assembly is suspended from member 25 at approximately its center of gravity, as shown in Figure 1, by means of an Allen screw which passes through the member and threadably engages stator 13.

An element 26 is mounted on a pedestal 27, the latter is located sufficiently forward of the base portion of bracket 18, as viewed in Figure 1, to provide clearance for mounting the scanner assembly to member 25, the clearance provided being sufficient to allow the scanner assembly to move during the balancing operation without contacting these members. As mounted element 26 has opposing upstanding spaced leg portions 28, a horizontally positioned arm 29 secured at one end to an end face of the suspension member extends forward so that its other end is located midway between the opposing legs of element 26. Knurled threaded contactors 30 pass through threaded aligned apertures in opposing legs 28, these contactors may be adjusted toward or away from arm 29 for a purpose which will be apparent presently. Element 26 is held in position on pedestal 27 by means of screws 31, which also serve as electrical connectors. Arm 29 is provided with contact points 32 positioned to contact the most adjacent ends of contactors 30 as the arm moves from its central position between the legs 28.

Electrical conductors 33 to 36, inclusive, extend between a phase converter 37 and the field winding of the scanner assembly passing through the base 17 and passageway 24, a switch 38 may be placed in one of the phase circuits. An electrical connector 39 extends between screws 31 and one contact terminal of a strobolume 40, the other contact terminal of the strobolume is connected to one pole of a 110 volt-60 cycle source of electricity 43. The rods 22 are also connected to the electrical source 43 by means of a connector 41, this latter connector passes through passageways 23 and 24 and is provided with a switch 42. Rods 22, member 25, arm 29, contactors 30, bracket 26, and screws 31 being electrical conductors it is seen current flows to the strobolume at such times as switch 42 is closed and points 32 contact either contactor 30. Phase converter 37 is supplied with three phase alternating current as indicated at 44. The wiring for the balancing apparatus, as described above, is schematically shown in Figure 3.

Pivotally mounted on bracket 18 by means of a pin 45 is a locking bracket 46 having spaced legs 47 which span the bracket 18. The bracket 46 is also provided with a bifurcated portion defining legs 48 and 49 adapted to contact respective opposite ends of the stator 13. This locking bracket has four pivotal positions located by spring actuated detent means 50 which position themselves in recesses 51 provided in the vertical sides of bracket 18. In the bracket's first position as shown in Figure 4, the outer ends 52 of legs 48 and 49 each contact their respective ends of stator 13, in the second position (Figure 4a) only leg 48 contacts its respective end of the stator, in the third position (Figure 4b) only leg 49 contacts its respective end of the stator, while in the fourth position (Figure 4c) neither of the legs 48 or 49 contact their respective ends of the stator leaving it free to vibrate. The ability of the legs 48 and 49 to contact or free themselves from respective ends of the stator 13, according to the position of bracket 46, is made possible by the angular construction of ends 52. Two dial indicators 53 are adjustably secured to base 17 adjacent the ends of the scanner assembly 12 so that vibration amplitudes thereof may be measured.

Locking rings 54 (only one being shown) similarly positioned adjacent each end of the rotor 14 retain the latter in position in stator 13. These rings are provided with a plurality of threaded bores 55 angularly spaced at equal intervals around their peripheries, these bores are adapted to receive No. 4–40×⅛ inch Allen set screws 56. A numbered disc 57 is attached to the face of ring 54 facing the strobolume. A locating mask 58 is pivotally positioned relatively close to disc 57, that is between the disc and the strobolume so that the latter will illuminate numbers on the disc through a window 59.

The rods 22 are made of an elastic material, having the proper length and density, so that their vibrational frequency is equal to the r.p.m. of the rotor 14, the r.p.m. of the rotor in turn determines the vibrational frequency of the scanner assembly 12 which in the present embodiment is 3600 r.p.m. As the vibrational frequency of the rods 22 and scanner assembly 12 is of the same frequency they will combine, accordingly a vibration of the scanner assembly of small magnitude, which might not otherwise affect indicators 53, will be detected. The rods 22 spaced as shown in Figure 1 precludes any up and down movements of the ends of the scanner assembly 12 restricting them to a fore and aft movement substantially in a horizontal plane. The vibrational amplitudes of the scanner assembly are proportional to unbalanced masses of the rotor 14, the aforementioned Allen screws 56 are threaded into bores 55 to balance these masses. A number four (#4–40) Allen screw one-eighth inch in length weighs approximately eight (.08) hundredths of a gram, this amount of weight results in the pointer of dial indicators 53 deflecting six ten-thousandths (.0006″) of an inch. The scanner assembly must be balanced to within an accuracy of three-hundredths (.03) gram inches which represents a deflection of the indicator's pointer of approximately three ten-thousandths (.0003″) of an inch.

With the present balancing apparatus thus generally described, the relation of the various parts will be made clearer by the following description of a balancing operation.

*Operation*

Assuming the scanning assembly 12 is in a position to be balanced, i.e., suspended on member 25, as shown in Figures 1 and 4, locking bracket 46 is placed in its fourth position in which the scanner assembly is free to vibrate. The strobolume 40 is positioned so that light rays therefrom will pass through window 59 to illuminate numerals on disc 57. Electrical connectors 33 to 36, inc., must not be taut between bracket 18 and stator 13 or vibrations of the scanner assembly will be dampened. Feeler elements of the dial indicators are positioned in contacting relationship with each end of stator 13, the pointer of each indicator reading zero with the rotor 14 at rest. Switch 38 is closed allowing rotor 14 to gain its full operating speed of 3600 r.p.m. The vibrational amplitudes at each end of the scanner assembly is noted by observing the deflection of each pointer of the dial indicators. Locking bracket 46 is now positioned to dampen the end of scanner assembly having the least amount of vibration, the other end being free to vibrate. In the event equal vibrations are indicated at each end of the scanner assembly the balancing procedure may begin with either end.

The above adjustments and observations completed rotor 14 is allowed to come to rest. Assuming vibrations of greatest magnitude are indicated at the left end of scanner assembly 12, as viewed in Figure 1, locking bracket 46 is placed in its third position in which leg 49 only contacts stator 13, the left end being free to vibrate. With the rotor at rest the pointer of the left hand indicator is again set at zero after which the rotor is again brought to operating speed. The amount of unbalance is noted by observing the amount of pointer deflection of the left hand indicator from zero. Switch 42 is closed, right hand contactor 30 is adjusted until a minimum of contact causes the strobolume to flash, the flashing of the strobolume makes the number or numbers visible through window 59 where weight must be added (or deducted at a diametrically opposite position) in bores 55 to balance rotor 14 and consequently scanner assembly 12. The rotor is again brought to rest, the appropriate weight is then added, as determined by the left hand indicator, in the proper bore 55 to effect balance of the left portion of the scanner assembly. This operation is repeated until the proper balance is effected, this condition is recognized by the fact that numbers will no longer be plainly visible or distinguishable through window 59.

The above balancing operation is then repeated in connection with the right hand end of the scanner assembly, during this operation locking bracket 46 is placed in its second position in which leg 48 contacts and arrests vibrations of the left hand end of scanner assembly 12 leaving its right end portion free to vibrate.

With both ends of the scanner assembly balanced, locking bracket 46 is placed in its fourth or neutral position, in this position of the locking bracket vibrations of the scanner assembly is affected only by suspension rods 22. The vibrations of the scanner assembly are noted under these conditions. As mentioned above the error in balancing, in the present instance, must not exceed three-hundredths (.03") gram inches which corresponds to a pointer deflection on the dial indicators of approximately three ten-thousandths (0.0003") inches. Using apparatus as described and following the above procedure it is possible to balance a rotating part within very exacting limits, e.g., it is possible to eliminate error to a point where it is not perceptible on dial indicators marked in graduations of one ten-thousandths of an inch (0.0001"). This extreme accuracy is due to the fact that the vibrational frequencies of rods 22, the r.p.m. of rotor 14, and consequently the vibrational frequency of scanner assembly 12 are identical, thus the vibrations of the scanner assembly will not be dampened and may be slightly augmented by the suspension means.

The balancing apparatus of the present invention has been described in connection with the balancing of a scanner assembly for a star tracking device, however it will be apparent to those skilled in the art that it may be utilized to balance many other units, e.g., electric motor armatures, crank shafts, shaft and gear combinations, etc. Adapters whereby a unit may be suspended from rods 22 and means for rotating the unit, such as a driving quill which will not affect its vibrational amplitude, is the only requirement.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claim.

What is claimed is:

In apparatus for determining the dynamic unbalance of an elongated test specimen during the rotation thereof, the combination comprising: a fixture including a base portion and an elevated portion, the latter portion having a projecting portion vertically spaced above said base portion; a support member adapted to rotatably support an elongated test specimen to be balanced by said apparatus; a pair of spaced parallel rods extending between said projecting portion and support member so that the latter is suspended vertically below said projecting portion; the points of attachment of said pair of spaced rods to said support member and projecting portion are located inwardly from the ends of said test specimen, and the axes of said pair of spaced rods and the axis of said test specimen lie in a common vertical plane at such times as said test specimen is mounted in said support member and is at rest; each of said spaced rods has a vibrational frequency corresponding to the revolutions per unit of time of the test specimen; the points of attachment of said pair of spaced rods are further characterized in that they are located on opposite longitudinal sides of the center of gravity of the test specimen when being balanced; a U-shaped bracket having first and second ends of different angular configuration; said bracket being pivotally mounted on said fixture for angular movement between a first position in which said first and second ends are both in contact with the respective end of said test specimen, a second position in which said first end only is in contact with one of the ends of said test specimen, a third position in which said second end only is in contact with the other end of said test specimen and a fourth position in which said first and second ends are both spaced from the ends of said test specimen.

References Cited in the file of this patent

UNITED STATES PATENTS

| 209,475 | Harris | Oct. 29, 1878 |
| 1,252,695 | Hopkins | Jan. 8, 1918 |
| 1,321,308 | Hinkley | Nov. 11, 1919 |
| 1,442,316 | Whipple | Jan. 16, 1923 |
| 2,090,803 | Moore | Aug. 24, 1937 |
| 2,328,114 | Weaver et al. | Aug. 31, 1943 |
| 2,451,863 | Oakley | Oct. 19, 1948 |

FOREIGN PATENTS

| 531,152 | France | Oct. 17, 1921 |
| 546,509 | Great Britain | July 16, 1942 |